May 8, 1951 G. A. McCULLOUGH 2,551,753
PHOTOGRAPHIC LIGHTING BANK
Filed Feb. 21, 1947
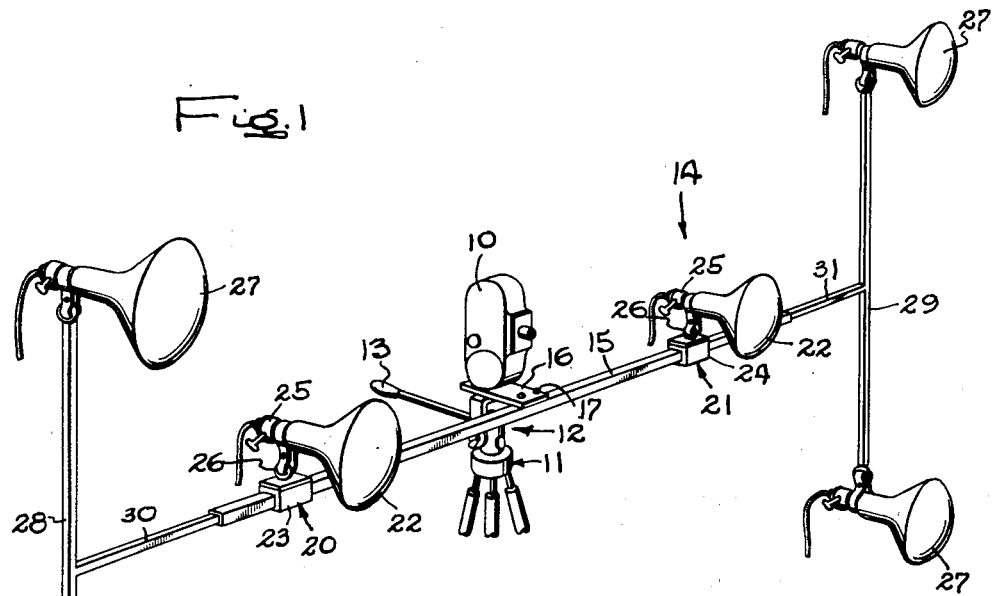
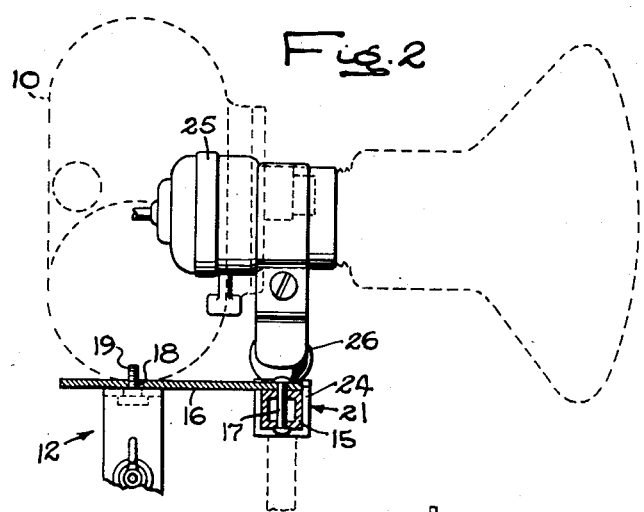
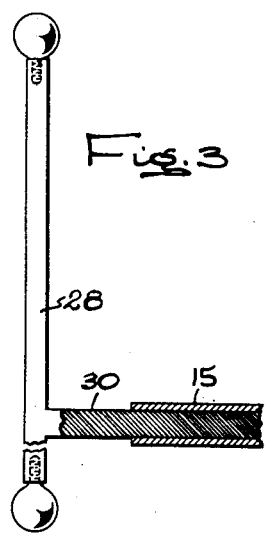
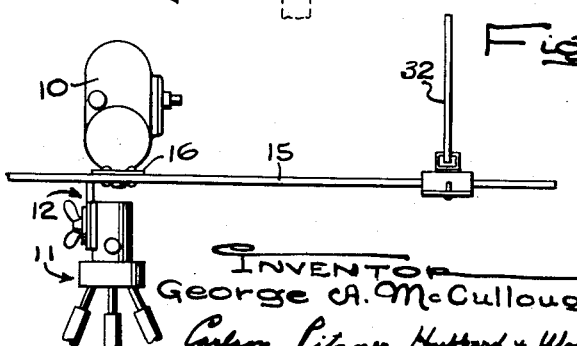
INVENTOR
George A. McCullough
Carlson, Pitzner, Hubbard & Wolfe
ATTORNEYS Patented May 8, 1951

2,551,753

UNITED STATES PATENT OFFICE 2,551,753

PHOTOGRAPHIC LIGHTING BANK

George A. McCullough, Chicago, Ill.

Application February 21, 1947, Serial No. 729,916

3 Claims. (Cl. 240—2)

The present invention pertains generally to lighting banks for photographic use, and more specifically to a lighting bank for a camera supported upon a stand having a tiltable head.

Successful practice of the photographic art has always been inherently related to mastery of the technique of illumination. The outdoor photographer must have a keen appreciation of the effect of natural light upon his subject and his equipment. The indoor photographer has to depend for satisfactory results upon the dexterous handling of various mechanical units designed to supersede or supplement natural lighting.

The problem of obtaining proper illumination is one of substantial magnitude for the average professional photographer. It constitutes an even greater one for the average amateur, who often lacks the benefit of formal training and the extensive facilities ordinarily available to the professional operator. The amateur, like the professional, encounters his severest illumination difficulties with indoor subjects.

With the development and increased use of color photography, it has become desirable, and from the average amateur's standpoint financially necessary, to have equipment readily adaptable to use with either color or black and white film. Unfortunately, the particular illumination requirements of color film as compared with black and white film have heretofore presented a severe obstacle to the development of dual purpose illumination devices. Color photography requires high intensity, flat illumination; black and white requires diffused illumination to create the proper highlights and shadows. Consequently, the generally accepted practice has been to traverse the obstacle by employing additional units of illuminating equipment.

In instances where standard illuminating devices are used, it is ordinarily necessary to modify the setup of these devices with every substantial change of the camera angle or the subject. Such modifications involve an undue amount of work and lost time.

In addition to the foregoing illumination problems, users of small movie cameras commonly experience another kind of trouble. Evidence of its presence is the noticeable jitter or tremor appearing on the screen when the film is projected, and which is particularly obvious during the shifting of scenes. The primary cause of the trouble is erratic motion applied to the camera or support when the pictures are being taken. This undesirable motion shows up in the film because the camera itself, or the camera and supporting head together, lack sufficient rotational inertia to damp it out.

One of the objects of the invention is to provide a lighting bank for a camera supported on a stand having a tiltable head and which, after an initial adjustment for conditions in a given area, needs no further attention regardless of subsequent shifts of camera angle or changes of subject within that area.

Another object is to provide a single lighting bank for a tiltably supported camera, the bank being quickly adjustable to produce illumination of the proper characteristic for either color or black and white photography.

A further object is to provide a lighting bank of the foregoing type which will have a proper distribution of mass to damp out erratic motion which may be imparted to the camera by the operator.

Other objects and advantages will become apparent as the description proceeds and in the light of the accompanying drawings, in which:

Figure 1 is a perspective view of an embodiment of the invention as applied to a small movie camera supported upon a tripod having what is known as a panoramic head.

Fig. 2 is a sectional view taken on the fore and aft center line of the lighting bank and showing the relationship between the camera and various elements of the bank, including a swivel-mounted lamp.

Fig. 3 shows a minor modification in the construction of a lamp carrying bracket.

Fig. 4 shows a modification in which the central tube of Fig. 1 is employed as a supporting bar for either a mirror or title cards.

While the invention is susceptible of various modifications and alternative constructions, a preferred embodiment has been shown in the drawings and will be herein described in some detail, but it is to be understood that there is no intention to limit the invention to the specific form disclosed, the intention being, on the contrary, to cover all modifications and alternative constructions falling within the spirit and scope of the invention as expressed in the appended claims.

Referring to the drawings, a lighting bank embodying the present invention is shown with a small movie camera 10, supported on a conventional tripod 11 having what is known as a panoramic head 12. Such a supporting head may be arranged to tilt in any direction or, as in the form shown, may be free to pivot about two mutually perpendicular axes. It is relatively common for a panoramic head to be equipped with a handle 13 for convenience in adjusting the camera.

The lighting bank embodying the invention is generally designated in Fig. 1 by the numeral 14. The entire structure is built upon an elongated central supporting member, such as tube 15, having any convenient mounting means for rigid attachment to the camera. In the present instance, such means comprises a plate 16 fastened to the tube as by rivets 17. Near its projecting end, the plate has a hole 18 for cooperation with a camera securing means, such as a machine screw 19 normally carried by the tripod head. As indicated in Fig. 2, the plate 16 may be conveniently clamped between the camera and the tripod head by merely inserting the screw 19 into the hole 18, and tightening the former until there is sufficient frictional engagement between all the abutting surfaces to constitute a rigid connection.

Symmetrically disposed with respect to the plate 16 are exially adjustable lamp mountings 20 and 21 having sockets adapted to receive appropriate photographic flood lamps 22. In the form shown, the supports comprise relatively short sleeves 23 and 24, movable toward or away from the camera along the axis of the tube 15, but non-rotatable thereon. Also included in the mountings 20, 21 and directly attached to the sleeves 23 and 24 are somewhat conventional lamp sockets 25 and ball swivel fittings 26.

Additional lamps 27, having mountings similar to those of the lamps 22, are supported at the extremities of a pair of carrying bars or brackets 28 and 29 located on opposite ends of the central tube 15. These brackets may comprise elongated members or arms of material generally similar to that in the central tube, as in Fig. 1, or they may be fabricated of bar stock as in Fig. 3. Each bracket has a centrally located protuberance or leg 30, 31, unitary therewith and telescopically but non-rotatably related to the central tube. By the use of this construction, the lamps 27 are made readily adjustable toward or away from the camera in a manner similar to that involved in adjusting the lamps 22.

Tightening means may, if desired, be provided on the sleeves 23 and 24, and at the extremities of the central tube 15, for clamping the lamp adjusting members in a given position. However, it has been found entirely satisfactory to dispense with such means and depend merely upon the friction between the sliding parts.

The electrical circuit employed in connection with the present invention is conventional and forms no part thereof. In general, it may comprise a series-parallel dimming arrangement, the flexible leads from the lamps being connected to a separately located control box, not shown. As a practical matter, it has been found desirable when the lighting bank is used in a home, to take power from the house wiring at a point between the main line fuses and the house fuse box.

In operation, the lighting bank is set up in rigid attachment with the camera and tripod head, after the manner of Fig. 1. It is readily apparent that by reason of this connection, any movement of the camera will be accompanied by a corresponding movement of the lighting bank. Once the intensity of the illumination has been set for a particular area such as a room, the line of sight of the camera may be shifted from one part of the room to another, and the subjects changed in any desired sequence, without the need for additional adjustments. The photographic result obtained through the use of the device is equivalent to that produced by having the entire room illuminated at high level. If color film is to be used, it will be desirable to adjust the lamps as close to the camera as possible, the concentration of light sources producing the requisite high intensity, flat illumination. For use with black and white film, the lamps should be adjusted in the opposite direction, the spaced apart arrangement producing the necessary diffused illumination.

By locating lamp mountings near the extremities of the upright brackets 28, 29, a substantial mass is disposed at a sufficient distance from the center of tilt to create a relatively large rotational inertia in the combined camera and lighting bank assembly about any axis through such center. The lamp mountings on the tube 15 of course contribute to this inertia, but to a much lesser extent. The flywheel effect of such inertia serves to minimize any disturbances resulting from erratic movements or tremor imparted to the camera through the manual operating lever 13, for example.

Fig. 4 illustrates a modification wherein the central tube 15 may be attached to a camera and tripod head parallel to the line of sight, the purpose being to support in front of the camera a mirror 32 adjustable to various angles for difficult side shots. Another use includes the holding of title cards during the preparation of moving pictures.

I claim as my invention:

1. A lighting bank for a camera adapted to be supported on a tripod having a tiltable head independently movable with respect to said tripod, said lighting bank comprising, in combination, an elongated horizontal lamp supporting member of generally rectangular cross-section and having means midway of its ends for rigid attachment both to the camera and to the movable head in position to extend transversely of the line of sight, two sleeves non-rotatably slidable on said member respectively at opposite sides of said means for independent adjustment toward and from the camera, a swivel fixture carried by each of said sleeves for receiving and supporting electric lamps, a pair of T-shaped brackets respectively mounted in non-rotatable telescoping relation with opposite ends of said member for independent longitudinal adjustment relative thereto, and swivel fixtures carried by the ends of said brackets for receiving and supporting electric lamps, said lighting bank together with the camera being freely movable as a rigid unit with respect to the tripod.

2. For use with a hand type motion picture camera and a supporting tripod having a tiltable head controlled by a manual lever, a lighting fixture comprising, in combination, an elongate central member of relatively light mass, a mounting element for carrying said central member, said mounting element being susceptible of rigid but detachable connection between the tiltable head and the camera, such connection rendering said fixture together with the head and the camera movable as a unit about the pivotal center of the head, a pair of lamp supporting brackets each substantially perpendicular to the general plane of said mounting element and also substantially perpendicular to said elongate central member, one of said brackets being located on either side of said mounting element, lamp mountings carried by said brackets adjacent their respective extremities and adapting said brackets to define a substantially rectangular pattern of light sources with the camera generally centered thereamong, and slidable connections interposed between said lamp brackets and said elongate central member rendering said lamp supporting brackets susceptible of adjustment longitudinally thereof for effecting a high intensity flat illumination by relatively closely spaced grouping of lamps and a lower intensity diffused illumination by means of a relatively widely spaced grouping of lamps.

3. A lighting fixture for use with a hand type motion picture camera and a supporting tripod having a tiltable head controlled by a manual lever, said fixture comprising, in combination, an elongate central member of relatively light mass, a mounting element for said central member, said mounting element being susceptible of rigid but detachable connection between the tiltable head and the camera, such connection rendering said fixture together with the tiltable head and the camera movable as a unit about the pivotal center of the head, lamp supporting brackets of relatively light mass mounted on said elongate central member in straddling relation therewith and also with said mounting element, said brackets being substantially perpendicular to the general plane of said mounting element and also generally perpendicular to said elongate central member, slidable connections between said lamp brackets and the end portions of said central member, and lamp mountings secured to said brackets adjacent their respective extremities, said lamp mountings being adapted to receive flood lamps, said lamp mountings also being adapted to provide a relatively large increase in the rotational inertia of said fixture about the pivotal center of the tiltable head for damping out tremor imparted to the camera via the manual lever.

GEORGE A. McCULLOUGH.

REFERENCES CITED

The following references are of record in the file of this patent:

UNITED STATES PATENTS

| Number | Name | Date |
|---|---|---|
| D. 128,505 | Simpson | July 29, 1941 |
| 649,544 | Morse | May 15, 1900 |
| 1,109,206 | Dexheimer et al. | Sept. 1, 1914 |
| 1,834,428 | Seitz | Dec. 1, 1931 |
| 1,919,554 | Howell | July 25, 1933 |
| 2,280,901 | Eddy | Apr. 28, 1942 |
| 2,325,569 | Hancock et al. | July 27, 1943 |
| 2,418,067 | Carpenter, Sr. | Mar. 25, 1947 |